(12) United States Patent
McClune

(10) Patent No.: US 7,469,632 B1
(45) Date of Patent: Dec. 30, 2008

(54) FIELD HARVESTER FOR SWEET SORGHUM

(76) Inventor: Lee F. McClune, 705 S. 7th St., Knoxville, IA (US) 50138

( * ) Notice: Subject to any disclaimer, the term of this patent is extended or adjusted under 35 U.S.C. 154(b) by 328 days.

(21) Appl. No.: 10/429,091

(22) Filed: May 2, 2003

(51) Int. Cl.
*B30B 9/20* (2006.01)
(52) U.S. Cl. .................................................. 100/121
(58) Field of Classification Search ................ 56/51, 56/52, 164 D, 327.1; 460/123, 130, 131, 460/149, 150; 127/43, 4, 2; 100/121, 75, 100/101; 241/101.742, 159, 158, 167
See application file for complete search history.

(56) References Cited

U.S. PATENT DOCUMENTS

| | | | | |
|---|---|---|---|---|
| 985,440 | A * | 2/1911 | Needham | 56/51 |
| 3,093,064 | A * | 6/1963 | Burner et al. | 100/37 |
| 3,424,611 | A * | 1/1969 | Miller | 127/2 |
| 3,430,584 | A * | 3/1969 | Bushmeyer | 425/236 |
| 3,464,856 | A * | 9/1969 | Smith | 127/50 |
| 3,485,016 | A * | 12/1969 | McClellan et al. | 56/164.4 D |
| 3,695,931 | A * | 10/1972 | Hamill | 127/4 |
| 3,697,342 | A * | 10/1972 | Steele et al. | 127/2 |
| 3,775,133 | A * | 11/1973 | Batley, Jr. | 426/636 |
| 4,043,832 | A * | 8/1977 | Leibig et al. | 127/6 |
| 4,109,448 | A * | 8/1978 | Kline | 56/13.5 |
| 4,332,125 | A * | 6/1982 | Holdren | 56/1 |
| 4,407,111 | A * | 10/1983 | Brune et al. | 56/16.4 R |
| 4,445,313 | A * | 5/1984 | Elliott et al. | 56/16.4 C |
| 4,446,678 | A * | 5/1984 | Smith | 56/1 |
| 5,950,938 | A * | 9/1999 | Nishizaki et al. | 241/28 |
| 6,039,276 | A * | 3/2000 | Hatt et al. | 241/130 |
| 6,055,799 | A * | 5/2000 | Savoie et al. | 56/16.4 R |
| 6,355,110 | B1 * | 3/2002 | Donovan et al. | 127/55 |
| 6,406,546 | B1 * | 6/2002 | Donovan et al. | 127/55 |
| 6,406,548 | B1 * | 6/2002 | Donovan et al. | 127/55 |
| 2001/0002037 | A1 * | 5/2001 | Cullinger | 241/101.742 |

FOREIGN PATENT DOCUMENTS

RU 2062700 * 6/1996
WO WO93/16794 * 9/1993

OTHER PUBLICATIONS 1 sheet entitled "Ethanol from Sweet Sorghum" by Iowa Engergy Center.

* cited by examiner

*Primary Examiner*—Árpád Fábián-Kovács
(74) *Attorney, Agent, or Firm*—Sturm & Fix LLP

(57) ABSTRACT

Present-day harvest methods for sweet sorghum are labor intensive, and/or require that large quantities of matter be removed to a central location for processing. A field harvester for sweet sorghum would cut the crop and reduce it to its separated juice and solids in the field. A cutter/feeder unit cuts the crop off and feeds it into a multiple roller press where most of the juice is removed. An optional screw press may be used to further remove juices from the solids. The solids are filtered from the juice using an endless belt filter press unit. The pH of the juice may be adjusted by the addition of some acid to inhibit bacterial action. The solids may optionally be pelletized for use as livestock feed or for fuel. The juice is temporarily stored on the harvester in a mounted or pull-behind tank before it is transferred, ultimately, to a nearby storage/processing location.

28 Claims, 5 Drawing Sheets

FIELD HARVESTER FOR SWEET SORGHUM

CROSS REFERENCE TO RELATED APPLICATIONS

This application is related to U.S. patent application Ser. No. 10/428,585 filed May 2, 2003 entitled PROCESS FOR HARVESTING AND PROCESSING SUGAR PRODUCING CROPS.

BACKGROUND OF THE INVENTION

1. Field of the Invention

The present invention relates generally to an apparatus for harvesting sugar producing crops. More particularly the present invention relates to an apparatus for cutting and processing sweet sorghum in the field to yield its juices to be further processed by other equipment and processes outside the field.

2. Background Art

Traditionally, sweet sorghum has been harvested for sorghum syrup production by either cutting and handling the stalks by hand, or by chopping the stalks and blowing the chop into a forage wagon; in either case, the resulting plant matter is carried to a central processing station for the extraction of the juice, cooking, and reduction of the juices to sorghum syrup.

The former method requires a large expenditure of manual labor and is typically only used for small, family sized operations. The juice from the stalks is often squeezed using a single-roller press powered by a horse, mule, or lawn tractor.

The method of chopping the stalks in the field like ensilage is less labor intensive than the previously mentioned method and larger crops may be harvested and processed this way. The drawbacks of this method, however, are that an enormous amount of crop must be transported out of the field to a central processing location, and the resultant organic matter must be returned to the field or otherwise disposed of.

Energy is a matter of concern to the country, and will continue to be for some time. Air pollution has improved over the past several decades, but still remains an issue in parts of this country, as well. A recognized partial solution to both the energy and pollution problems is ethanol. Sweet sorghum juice, due to its high sugar content, is an ideal raw material for the production of ethanol. Sweet sorghum has the potential to produce over twice the ethanol per acre as corn, the most common raw material used for ethanol production, today, at significantly less cost. As it stands presently, more efficient harvesting of the sorghum crop must be employed to make the use of this crop for ethanol production feasible.

There is, therefore, a need for a low-labor, efficient apparatus for harvesting and field processing sweet sorghum and extracting the juices for further processing at or near the fields of each producer.

SUMMARY OF THE INVENTION

A main purpose of this invention is to provide an apparatus for harvesting and processing sweet sorghum crops by extracting the juices for further processing elsewhere.

A field harvester for sweet sorghum must incorporate a unit for cutting the stalks close to the ground and feeding them into a field harvester roller press unit. The extraction of the juice from the cane stalks is accomplished by the roller press, incorporating multiple rollers under high pressure, and an optional screw press unit.

A continuous belt filter press unit acts to remove solids from the juice while returning the resulting solids, or press cake, to the roller press unit for further processing to remove all the potential juices for subsequent processing.

If necessary (optionally), the pH of the juice may be adjusted (by the addition of acid) as it travels through the field harvester to reduce bacterial action in the juice, and as it is pumped into temporary storage. Depending on the operation and desired end product, yeast may be added to the juice within the field harvester as well.

A temporary storage tank, either on board the field harvester or pulled behind or to the side, contains the produced juice. From the field harvester, the juice is transported out of the field to a nearby storage and processing area. The juice may be converted to syrup, ethanol, lactic acid, or other value-added products.

The novel features which are believed to be characteristic of this invention, both as to its organization and method of operation together with further objectives and advantages thereto, will be better understood from the following description considered in connection with accompanying drawings in which a presently preferred embodiment of the invention is illustrated by way of example. It is to be expressly understood however, that the drawings are for the purpose of illustration and description only and not intended as a definition of the limits of the invention.

BEST MODE FOR CARRYING OUT THE INVENTION

Figure 1:
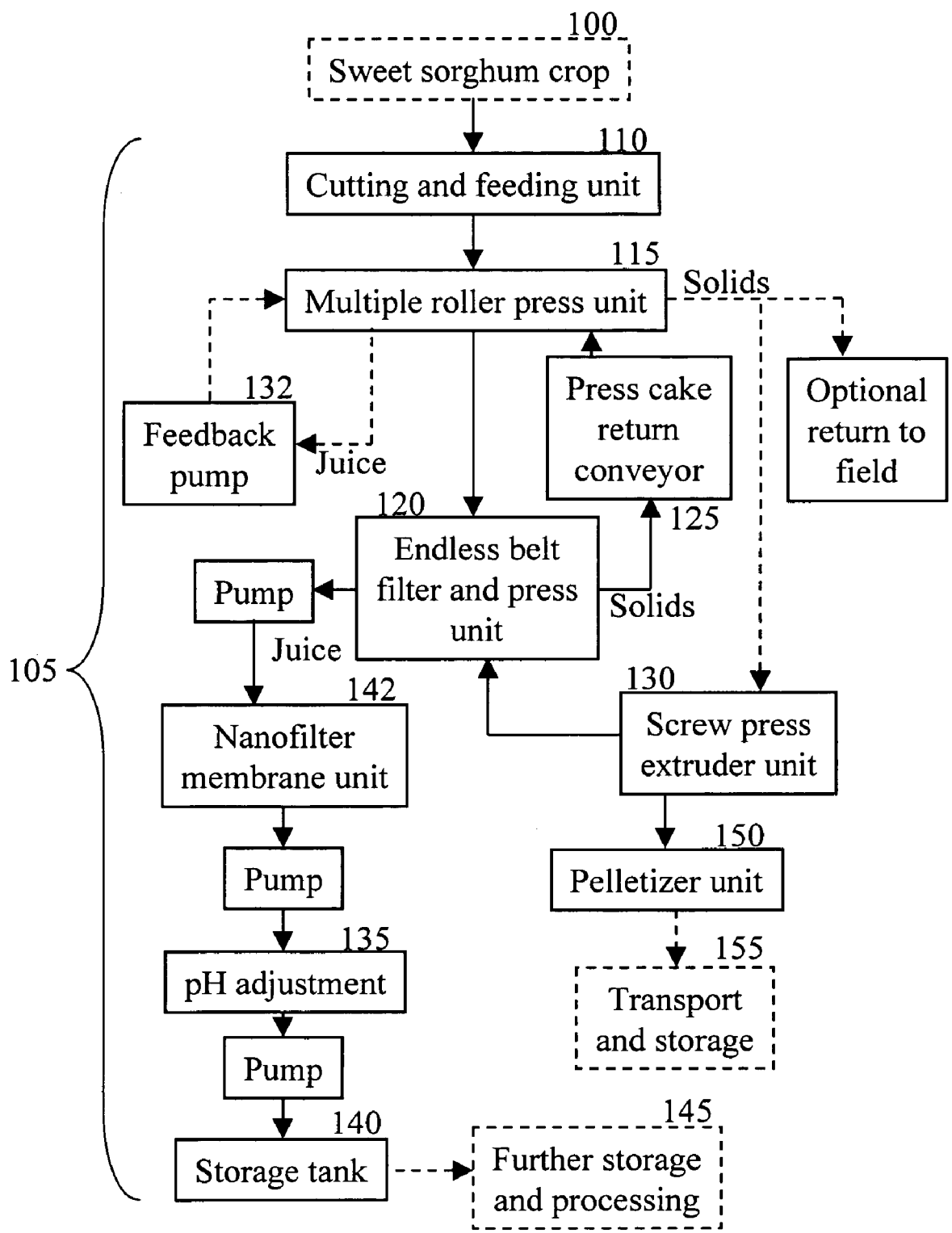
FIG. 1 shows a flow diagram of a sweet sorghum field harvester.

A flow diagram for a mobile sweet sorghum field harvester 105 is shown in FIG. 1. At the top, the sweet sorghum crop 100, mature for harvest, is harvested by the field harvester 105. The cutting and feeding unit 110 (which may be a row-type or rowless header unit) cuts the crop off near the ground and feeds it into a multiple roller press unit 115 for the primary step of separating the juices from the solids. The extracted juices are passed to an endless belt filter press unit 120, where the solids are strained out of the juice. From the endless belt filter press unit 120, the solids continue via a filter cake return conveyor 125 (in the form of an auger or continuous web chain, or other conveyor) that returns them to the multiple roller press unit 115 for additional juice extraction. The solids exiting the multiple roller press unit 115 may pass to an optional screw press unit 130 where the last of the juice to be extracted is removed, or they may be returned to the field.

Some of the juice may be cycled back to the multiple roller press unit 115 by feedback pumps 132 to wash and help extract more of the sugars from the solids. The cleaned and filtered juices are then pumped to an on-board nanofiltration membrane unit 142 for partial removal of excess water and consequent increased concentration of the sugars. The water removed in the nanofiltration membrane unit 142 is used as belt filter wash water and to replenish the wash tank 540. The excess water is expelled to the field. Eventually, all the juices pass to an optional pH adjustment unit 135 where the pH is measured and adjusted to about 4.5–4.8 to inhibit bacterial action. If the final product is to be lactic acid or some other products, this step may be unnecessary. The juice then continues to an on-board or trail-behind storage tank 140 for temporary storage until the juices are transported to a storage and processing area 145.

Simultaneously, the solids leaving the screw press unit 130 are made into pellets in a rotary ring pelletizer unit 150 and transported to storage 155. These pellets may be used for fuel for distillation of the juices, for livestock feed, or for other purposes.

Figure 2A:
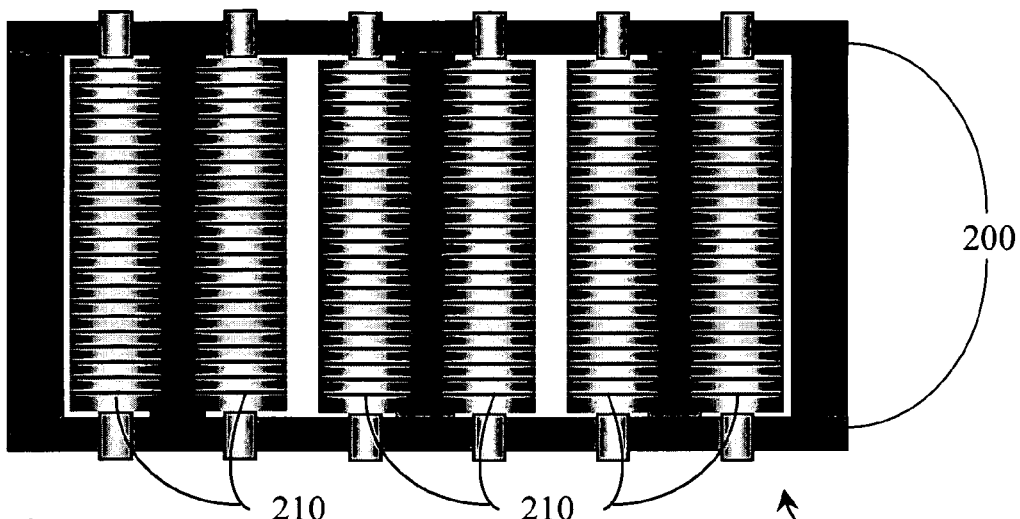
FIG. 2 show a roller press unit for removal of sugar-laden juices from the cane.
Figure 2B:
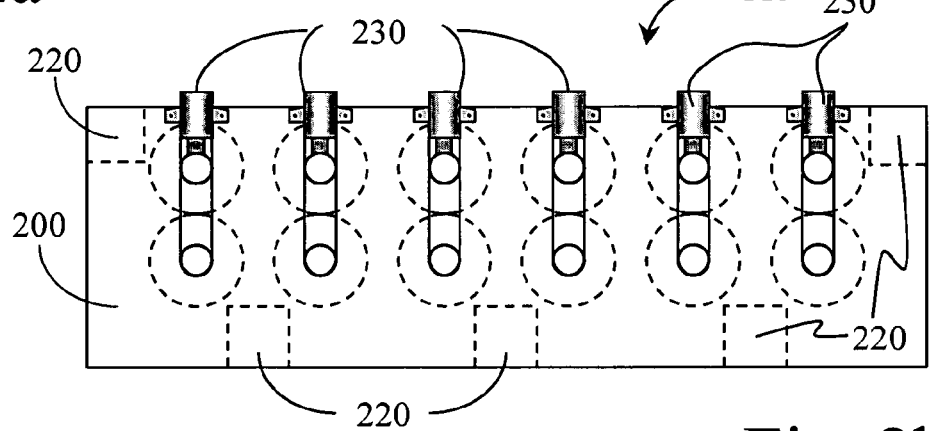
Figure 2C:
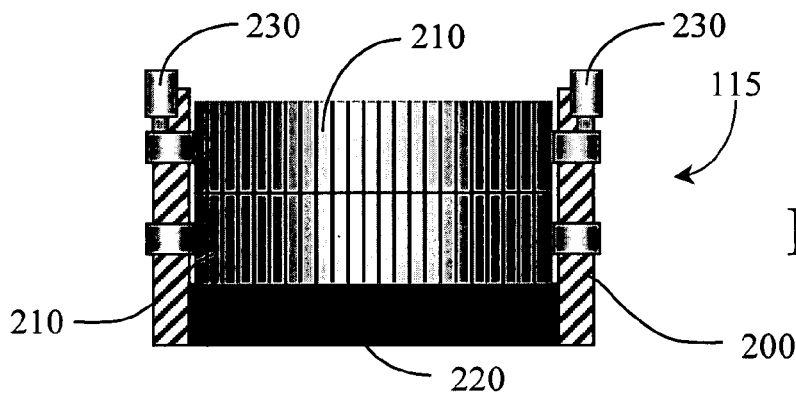

The multiple roller press unit 115 is shown in FIG. 2. The heavy side rails 200 of the frame support multiple rollers 210 whose purpose is to squeeze the juice from the stalks of the crop. The rollers 210 have optional grooves machined into them and are hung on double roller bearings at each end. Spacing between the side rails 200 is maintained by tie beams 220. High force is applied downward on the top layer of rollers 210 by hydraulic cylinders 230.

Figure 3A:
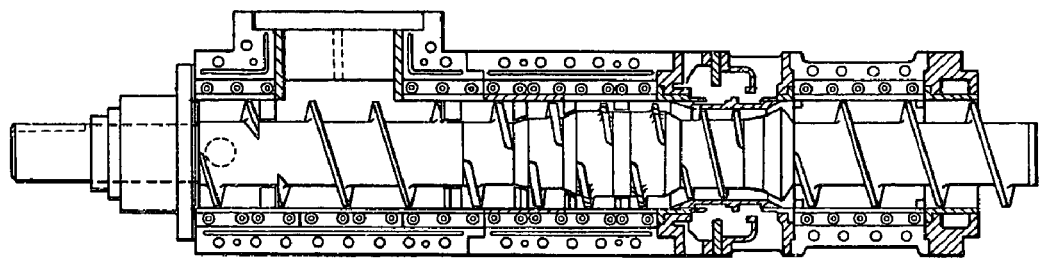
FIG. 3 show screw presses for further removal of sugar-laden juices from the cane.
Figure 3B:
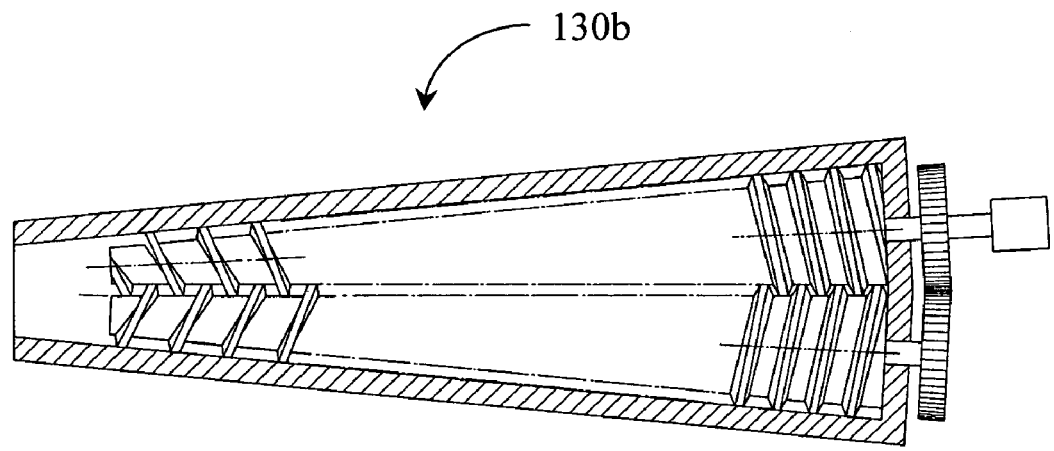

A screw press 130 is used to maximize the production of juice from the sweet sorghum crop. Typical examples are shown in FIG. 3, but this invention is not limited to any particular design of screw press. In FIG. 3a a single screw press 130a is shown, while in FIG. 3b a double screw press 130b is shown.

Figure 4:
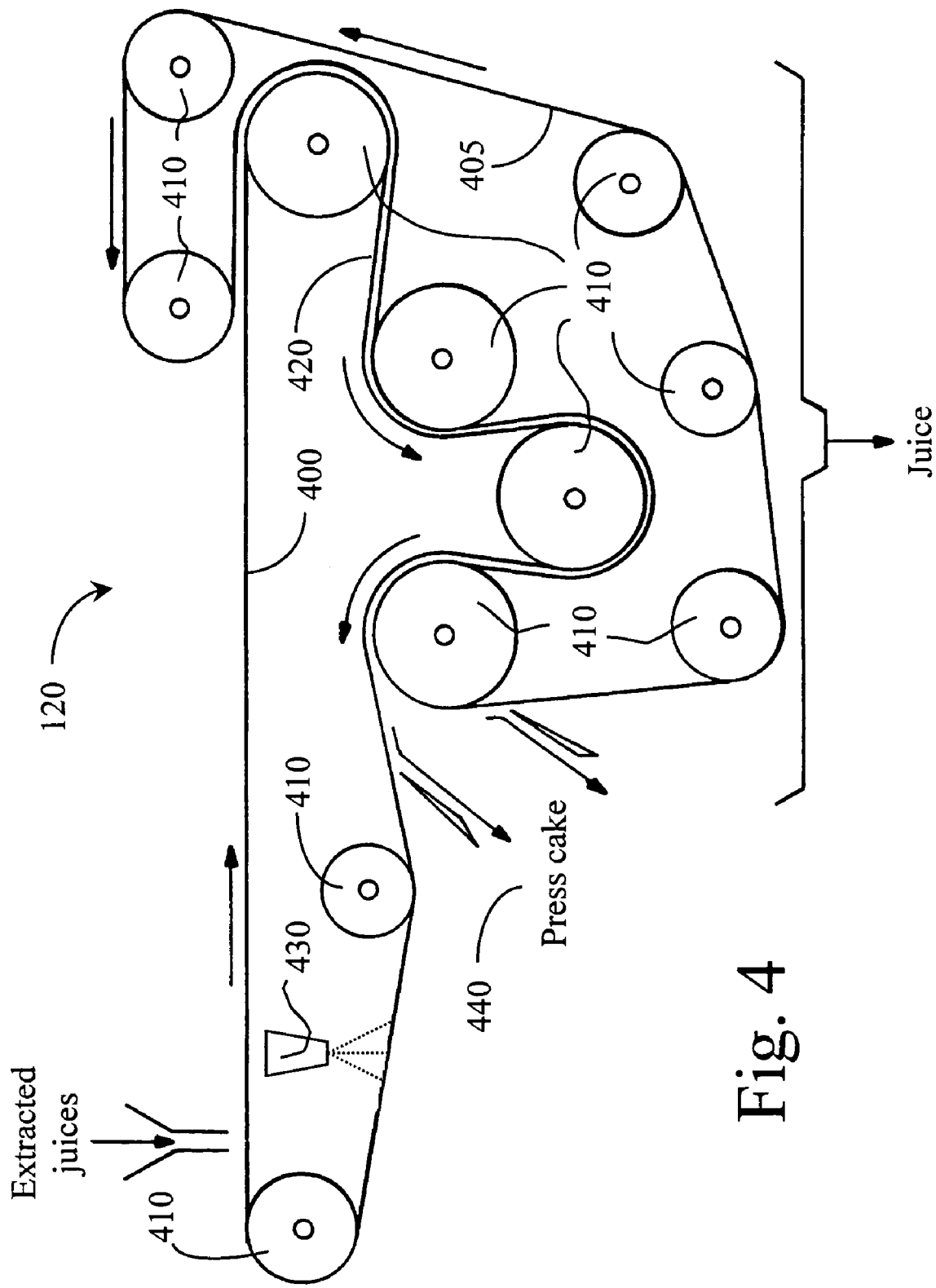
FIG. 4 shows an endless belt filter press unit.

From the multiple roller press unit 115 and the screw press unit 130, the extracted juices with entrained solids (slurry) pass to the endless belt filter press unit 120 shown in FIG. 4. Again, the present invention is not limited to a particular endless belt filter unit 120 design. As the name implies, the endless belt filter press unit 120 comprises two endless belts 400, 405 routed around a series of rollers 410. The belts run close to one another over part of their length 420 to compress and remove the entrained solids from the juices. This compression accomplishes two effects:

1. The squeezing of much of the juice from the solids.
2. The forming of a press cake 440 to be returned to the multiple roller press unit 115 for further juice extraction.

This press cake 440 is conveyed back to the multiple roller press 115 by the press cake return conveyor 125, where more of the juice is pressed out of the solids.

A water nozzle 430 sprays the filter belt 400 with water to clean the belt so it can be used continually during the harvest session without requiring periodic cleaning.

Figure 5:
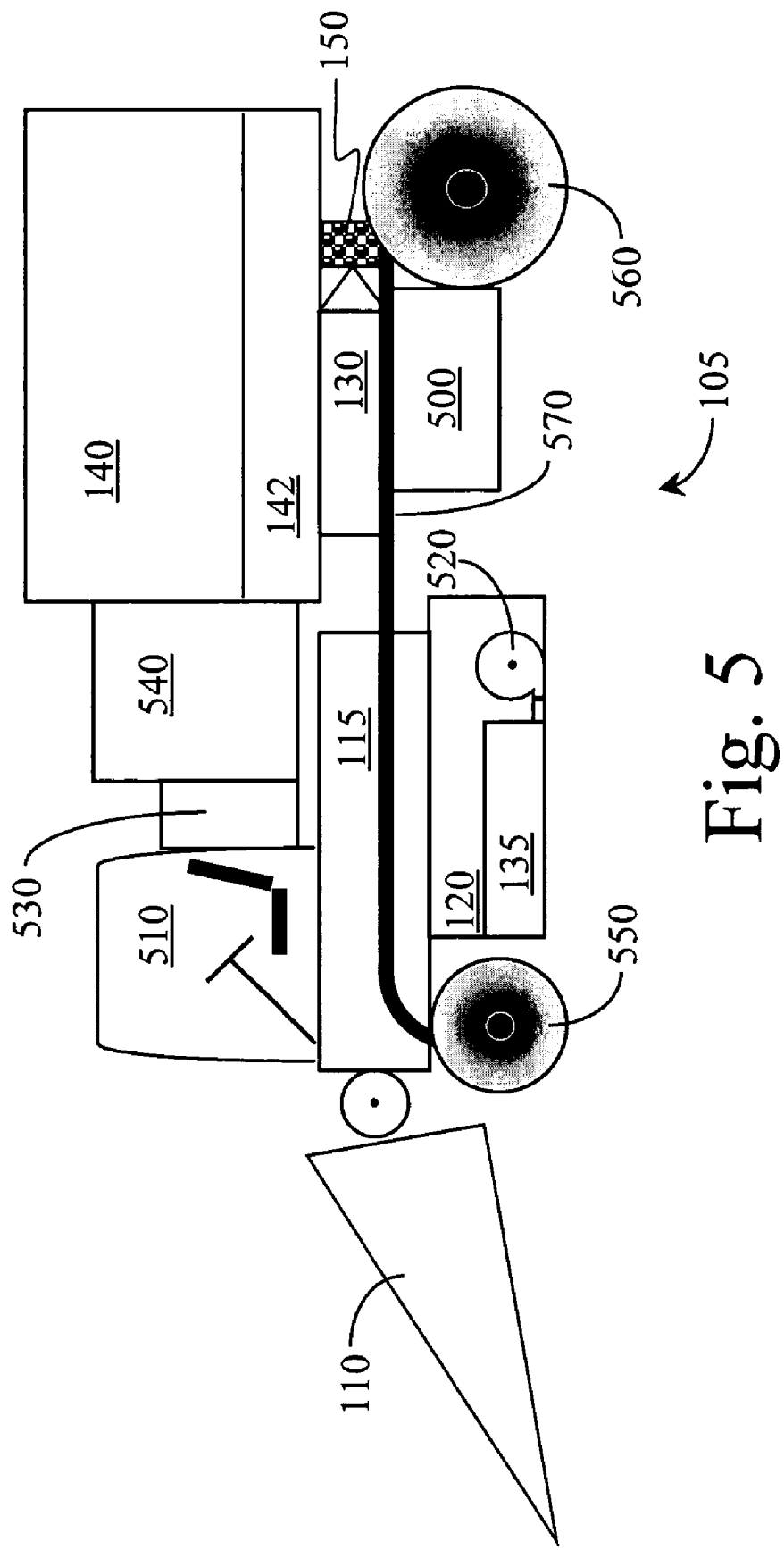
FIG. 5 shows a layout of a sweet sorghum harvester.

An example of how a sweet sorghum field harvester 105 may be laid out is shown in FIG. 5. The field harvester 105 is powered by an engine 500, preferably diesel. The harvester is operated from a cab 510. The cutting and feeding unit 110 is carried on the front of the field harvester 105 where the crop is sheared close to the ground and transferred to the multiple roller press unit 115 near the cab 510. The endless belt filter and press unit 120 is beneath the multiple roller press unit 115. Transfer and wash pumps 520 are in close association with the endless belt filter press unit 120 as it transfers the clean juice from the endless belt filter press unit 120 to the nanofiltration membrane unit 142. From the nanofiltration membrane unit 142, the pH of the juices is adjusted, if necessary, then the juices are put into a storage tank 140. A tank for acid 530 for adjusting the pH of the juice to about 4.5–4.8 is carried near the water tank 540. Yeast may also be introduced on board the harvester 105. Water, for washing the endless belt 400, is contained in a tank 540.

The solids, or bagasse, continue from the multiple roller press to the screw press unit 130, and then to a pelletizer unit 150 to form them into pellets useful for feed, fuel or other products.

FIG. 5 shows pairs of front wheels 550 and rear wheels 560 which are operatively, rotatably, and steerably attached to a frame 570. This frame 570 supports the other components of the preferred embodiment shown in FIG. 5. A track, not shown, can optionally encircle the front and rear wheels 550 and 560 on each side of the field harvester 105 to make the field harvester 105 to make the field harvester 105 a track type machine. If converted to a track-type machine, the wheels 550 and 560 may be steel wheels with teeth, for example.

The sweet sorghum field harvester 105 need not be a self-propelled machine as indicated in FIG. 5. A sweet sorghum field harvester 105 that is made to be pulled behind a tractor or other vehicle, and powered via a power takeoff shaft or other means is a viable alternative and may be attractive for smaller operations.

The field harvester described above may be used for any sugar-containing crop including sweet sorghum and sugar cane.

The above embodiments are the preferred embodiments, but this invention is not limited thereto. Many of the elements mentioned, above, are optional, providing for a large degree of flexibility and pricing. It is, therefore, apparent that many modifications and variations of the present invention are possible in light of the above teachings. It is, therefore, to be understood that within the scope of the appended claims, the invention may be practiced otherwise than as specifically described.

I claim:

1. A mobile field harvester for traveling over the surface of ground in a field of sugar containing crop for harvesting sugar-containing crops comprising:
    (a) a frame having a front end and a rear end, the rear end being fixed with respect to the front end;
    (b) a roller press for extracting juice from a solid component of the sugar-containing crop operatively attached to the frame and disposed in front of the rear end of the frame, said roller press comprising a plurality of roller pairs, each of said roller pairs comprising no more than two rollers, said rollers in each roller pair bearing against one another, the solid component of the sugar containing crop passing through each roller pair in succession;
    (c) a cutting and feeding unit for separating the sugar-containing crop from its roots operatively attached to the frame and moving the crop to the roller press without intermediate processing, said cutting and feeding unit being cantilevered forwardly from the front end of the frame as part of being said operatively attached to the frame;
    (d) wheels operatively rotatably attached to the frame for facilitating movement of the field harvester along the ground;
    (e) a container below the roller press for collecting said juice;
    (f) a juice storage tank; and
    (g) a pump operatively attached between the container and the juice storage tank for transferring juice from the container to the juice storage tank.

2. The mobile field harvester of claim 1 additionally comprising a screw press for extracting juice from a solid component of the sugar-containing crop operatively attached to the frame.

3. The mobile field harvester of claim 1 additionally comprising an endless belt filter press unit for separating the solid component from the juice of the sugar-containing crop.

4. The mobile field harvester of claim 1 additionally comprising a pH adjustment unit to reduce a pH of the juice to inhibit bacterial action.

5. The pH adjustment unit of claim 4 additionally comprising a pH measurement to control the pH reduction.

6. The mobile field harvester of claim 1 additionally comprising a pelletizer to convert the solid component of the sugar-containing crop to pellets.

7. The mobile field harvester of claim 1 additionally comprising an endless single belt filter for separating the solid component from the juice of the sugar containing crop and a nanofiltration membrane unit for removing excess water from the juice of the sugar-containing crop and using said excess water to wash the endless belt unit press filter to wash the endless single belt filter.

8. The mobile field harvester of claim 2 additionally comprising an endless belt filter unit for separating the solid component from the juice of the sugar-containing crop.

9. The mobile field harvester of claim 2 additionally comprising a pH adjustment unit to adjust a pH of the juice to inhibit bacterial action.

10. The pH adjustment unit of claim 9 additionally comprising a pH measurement unit to control the pH adjustment.

11. The mobile field harvester of claim 2 additionally comprising a pelletizer to convert the solid component of the sugar-containing crop to pellets.

12. The mobile field harvester of claim 2 additionally comprising a nanofiltration membrane unit for removing excess water from the juice of the sugar-containing crop.

13. The mobile field harvester of claim 1 including guiding means for causing the solid component of the sugar containing crop to pass through each roller pair in succession.

14. The mobile field harvester of claim 1 having sweet sorghum disposed in it.

15. The mobile field harvester of claim 1 including at least one hydraulic cylinder for biasing one roller in one roller pair against the other one of the rollers is said one roller pair.

16. The mobile field harvester of claim 1 including at least one hydraulic cylinder operatively attached respectively to each roller pair for biasing one roller of each roller pair towards the other roller of each roller pair.

17. The mobile field harvester of claim 1 wherein the rollers in each roller pair touch each other when there is no crop between said respective rollers in each roller pair.

18. The mobile field harvester of claim 1 wherein the cutting and feeding unit does not have ground engaging wheels but is supported solely by being said cantilevered operatively attached to the frame.

19. A mobile field harvester for traveling over the surface of ground in a field of sugar containing crop comprising:
   (a) a frame having a front end and a rear end, the rear end being fixed with respect to the front end;
   (b) ground engaging wheels operatively attached to the frame for facilitating movement of the field harvester in a field;
   (c) a roller press operatively attached to the frame and disposed in front of the rear end of the frame for extracting juice from the sugar-containing crop, said roller press comprising a plurality of roller pairs, at least one roller of each of said roller pairs being operatively biased towards the other roller in said respective roller pair during the time that the roller pairs are rotating, the solid component of the sugar containing crop passing through each roller pair in succession;
   (d) a feeding unit operatively attached to the front end of the frame for cutting the sugar containing crop to separate the sugar containing crop from where the sugar containing crop is attached to the ground and for moving the crop to the roller press, said feeding unit being cantilevered forwardly from the front end of the frame as part of being said operatively attached to the frame;
   (e) a container below the roller press for collecting said juice
   (f) a juice tank; and
   (g) a pump operatively attached between the container and the juice tank for transferring juice from the container to the juice storage tank.

20. The mobile field harvester of claim 19 further comprising means for guiding the crop from between one roller pair to between the rollers in a next adjacent roller pair in succession.

21. The mobile field harvester of claim 19 wherein each of said roller pairs comprising no more than two rollers.

22. The mobile field harvester of claim 19 including at least one hydraulic cylinder operatively attached respectively to each roller pair for biasing one roller for each roller pair towards the other roller of each roller pair.

23. The mobile field harvester of claim 22 wherein the rollers in each roller pair touch each other when there is no crop between said respective rollers in each roller pair.

24. The mobile field harvester of claim 19 including an outlet operatively attached to the roller press for directing a solid part of the crop back onto the field after the juice has been extracted therefrom.

25. The mobile field harvester of claim 19 wherein the feeding unit is directly connected to the roller press with no structure in the feeding unit for further processing of the crop between the cutting unit and the roller press.

26. The mobile field harvester of claim 19 including means operatively attached respectively to each roller pair for biasing one roller of each roller pair towards the other roller of each roller pair.

27. The mobile field harvester of claim 19 wherein the feeding unit does not have ground engaging wheels but is supported solely by being said cantilevered operatively attached to the frame.

28. The mobile field harvester of claim 19 wherein roller press is connected directly to the feeding unit without any processor disposed between the roller press and the feeding unit.

* * * * *